Patented Nov. 3, 1925.

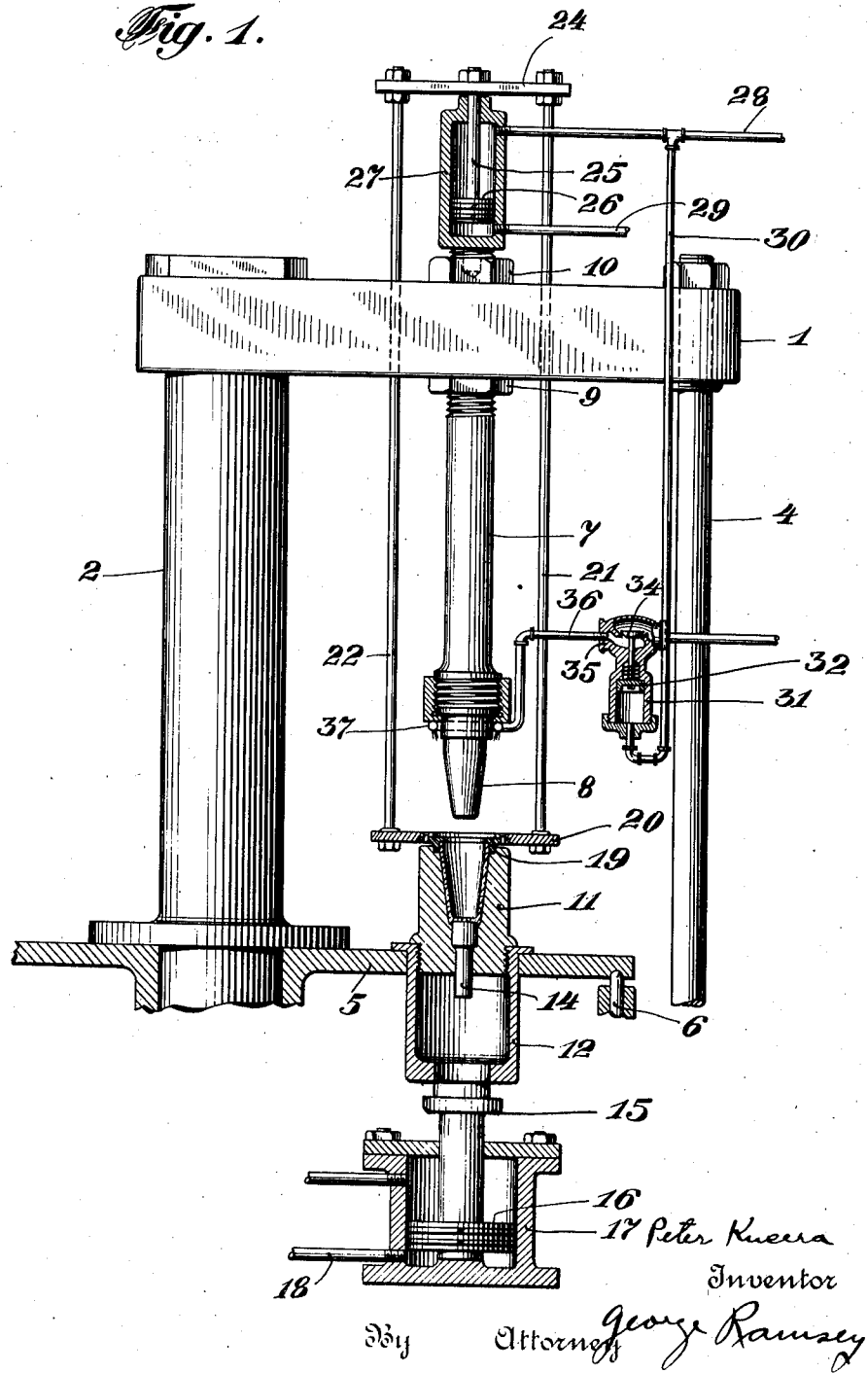

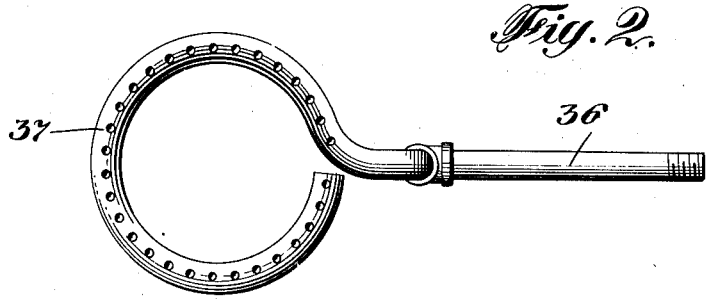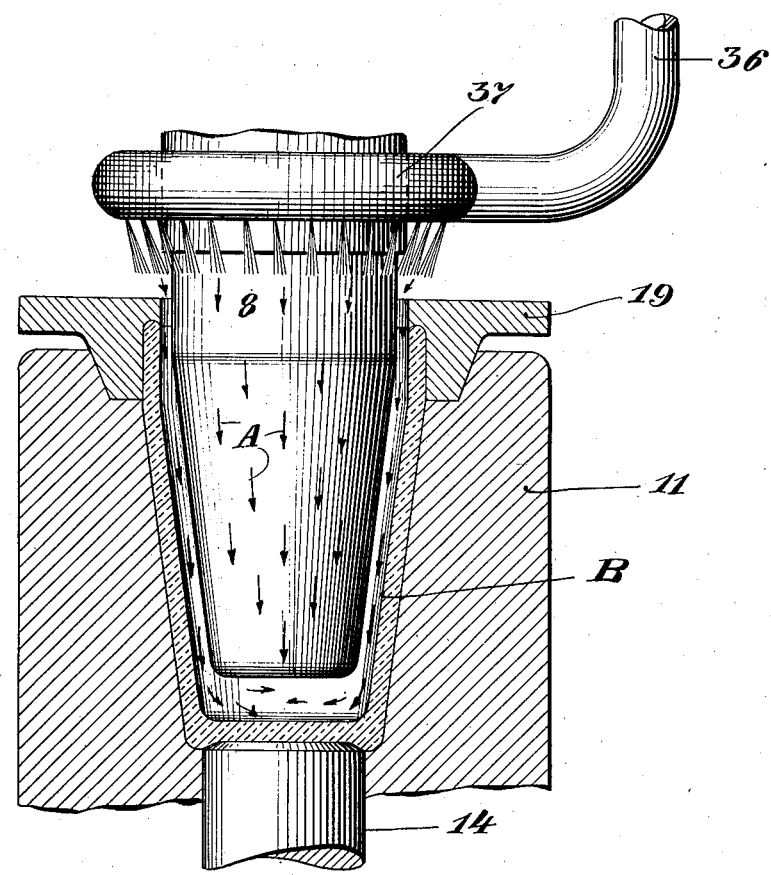

1,560,062

UNITED STATES PATENT OFFICE.

PETER KUCERA, OF PITTSBURGH, PENNSYLVANIA, ASSIGNOR TO CAPSTAN GLASS COMPANY, OF SOUTH CONNELLSVILLE, PENNSYLVANIA, A CORPORATION OF DELAWARE.

METHOD AND APPARATUS FOR COOLING GLASSWARE AND THE LIKE.

Application filed March 12, 1920. Serial No. 365,154.

*To all whom it may concern:*

Be it known that I, PETER KUCERA, a citizen of the United States, residing at Pittsburgh, in the county of Allegheny, State of Pennsylvania, have invented certain new and useful Improvements in Methods and Apparatus for Cooling Glassware and the like, of which the following is a specification.

This invention relates broadly to the cooling of articles, made from plastic charges, before the articles leave the molds; and more particularly relates to the manufacture of glassware.

The principal object of the present invention is to provide a construction for cooling pressed glass articles before the article leaves the mold.

Another object of the present invention is an improvement in presses for glass manufacture and wherein the ware is automatically cooled as the forming members separate and before the sustaining members of the mold are removed.

A still further object of the present invention is an improvement in machinery for manufacturing pressed glassware which comprises the provision of cooling fluids controlled as to presssure and direction and which are adapted to surround one of the ware-forming elements as the element is removed from the pressed article.

A still further and more specific object of the present invention is an improvement in glass machinery which relates to cooling ware in block molds provided with rings, in such manner that the ware is not distorted when the ring is removed.

A still further object of the present invention is an improvement in glass machinery wherein a current of air is directed in such manner as to flow over and surround a pressing plunger as it leaves the mold, and to continue after the plunger has left the mold whereby the glass in the mold is cooled to such a degree as to not distort when the ring mold is removed.

Still more specifically, the present invention contemplates an improvement in glass machinery in connection with automatically operated pressing machines provided with block molds and a single ring mold, and wherein the pressed glass within the ring mold is sufficiently cooled by the controlled cooling medium before the ring is lifted and prior to the movement of the mold from the pressing station.

From the following specific description it will be apparent that the present invention may be embodied in constructions other than those specifically outlined herein, so, therefore, I desire that the constructions herein shown and described shall be considered as illustrative and not in a limiting sense.

Figure 1 is a more or less diagrammatic view of portions of a press provided with the present invention.

Figure 2 is a view illustrating one form of cooling ring adjacent the plunger.

Figure 3 is a view illustrating the cooling fluid being projected between the plunger and the glass in the mold as the plunger is removed.

Heretofore in the art in the manufacture of glassware in block molds, particularly tumblers or packer's ware, it has been customary to provide removable ring molds at the top of the block mold. These ring molds are usually adapted to remain in position on the block mold during several movements of the mold table and are removed just prior to the mold reaching the discharging station, at which point the ware is usually automatically lifted from the block mold. Ordinarily these ring molds are removed manually just prior to the ware-carrying mold reaching the discharging station. Ring molds are usually relatively light in weight and consequently heat quickly, therefore there is liability of the glass sticking to the ring mold, and consequently the temperatures at which the glass must be worked on an automatic machine cannot rise beyond a predetermined point. It is specially desirable in the making of certain ware by automatic machinery that the glass be particularly hot. Where very hot glass is worked it has been found that there is a tendency of the ware to collapse as the plunger is withdrawn. Where the ware being made is for use in packing food products by automatically mechanically applied closures, it is necessary that predetermined dimensions be closely adhered to. In view of these facts, in ware made by the old methods of manufacture there are large quantities of glassware that cannot be used for packer's purposes.

The present invention overcomes the difficulties of the known art by providing a construction wherein cooling fluid, preferably air under pressure, is maintained between the plunger and the ware as soon as the plunger starts to withdraw from the pressed article. Fluid pressure which is established within the ware prevents the ware from collapsing and at the same time cools the articles being made, particularly at the upper edge where the coldest air enters the mold. It has been found by this construction that a single ring mold having a deep mold surface may be successfully used with a plurality of block molds, and the ware will be chilled sufficiently to permit withdrawal of the ring within the required period of time determined by the rate of production established by the movement of the press and the glass feeder. This obviates the necessity of changing rings manually from one mold to another, and at the same time permits the manufacture of deep "finished" packer's ware without slowing up the rate of production and without the necessity of shifting a plurality of ring molds.

Referring now to the drawings and more particularly to Figure 1 thereof, which represents a fragmentary portion of a press, the yoke 1 is mounted on a pedestal 2 and a supporting pillar 4. The pedestal carries a rotating mold table 5 that is locked at each station by a bolt 6 automatically operated with the movement of the mold table, all of which is common in the art. This yoke 1 carries a pressing plunger staff 7 on which is removably mounted a plunger head 8. The staff 7 is adjustably mounted in the yoke 1 by means of the adjusting nuts 9 and 10. The mold table carries a plurality of molds, one of which is shown, and it comprises a block mold 11 secured to a base 12 and provided with a ware lifter 14. The base 12 is adapted to cooperate with the pressing plunger 15 that is secured to a piston 16 mounted in a cylinder 17 which is adapted to be supplied with compressed air through a suitable pipe as at 18 when it is desired to press ware in the block mold 11 as will be later described. A ring mold 19 is mounted on a ring mold carrier 20 which is supported by carrying rods 21 and 22. These carrying rods connect at their upper ends with a cross bar 24 to which is connected the piston rod 25 of an air piston 26 that is mounted in a cylinder 27. This cylinder is connected by means of pipes 28 and 29 with a suitable source of compressed air. A pipe 30 leads from the pipe 28 to a cylinder 31 in which is mounted a piston 32. This piston is directly connected to a valve 34 mounted in the valve casing 35. The valve casing 35 controls a flow of compressed air through the pipe 36 which leads to a cooling ring 37 surrounding the head of the plunger 8.

Assuming a suitable charge of glass to have entered the block mold 11 and that the mold table has moved the mold to the pressing station beneath the plunger 8, compressed air is then supplied through the pipe 18, thereby lifting the piston 16, and through the connected parts raising the block mold 11 against the plunger 8. As the block mold 11 approaches the limit of its upward travel against the plunger 8, compressed air is automatically admitted through the pipe 28 to the cylinder 27, thereby tightly holding the ring mold 19 against the block mold 11 and the compressed air is continued on the pipe 28 after compression has been released from the cylinder 17 beneath the piston 16 so that the ring mold 19 continues to follow the block mold in its return movement and rests against the upper end of the block mold after return movement is completed. It is to be noted that as soon as pressure is admitted to the pipe 28 and to the cylinder 27 it is likewise admitted to the branch pipe 30 and to the cylinder 31, thus opening the line 36 just prior to the completion of the pressing operation so that as the pressing operation is completed blasts of cold air are directed through the openings in the ring 37, and downwardly along the side walls of the piston 8. This blast of air at its beginning spreads out over the top of the ring mold and tends to keep this mold cool. Immediately as the block mold 11 starts to descend the blast of air following the plunger 8 blows downwardly around the plunger as indicated by the arrows A in Figure 3 and forms a cushion of fluid pressure between the side walls of the glassware B and the plunger 8. This pressure maintains the glass against the side walls of the block mold 11 and the ring mold 19 and prevents collapse of the ware and at the same time cools the article being made. This air blast action continues as the plunger and the mold separate and is maintained until the pressure is relieved on the line 28 and air is admitted through the pipe 29 to raise the ring mold. This movement is just prior to the movement of the mold table which carries the pressed glassware to the next mold station and brings a mold carrying a new charge beneath the pressing station, when the operations are repeated.

From the foregoing it is clear that the instant the plunger begins to leave the pressed ware there is a cushion formed between the ware and the plunger and that this cushion gradually decreases as the plunger leaves the mold, until the final action is that of a cooling blast being directed downwardly into the ware which has just been pressed. This action facilitates rapidity of operation, simplifies the constructions for handling ring molds, and permits deep finished ware to be made with a single ring mold without distortion of the ware after the pressing operation.

From the foregoing it will be evident that the present invention also comprises the method of cooling glassware articles and the like by subjecting the pressed article to a cool air fluid during the removal of one of the mold members. It will also be apparent that the invention comprises the method of supporting the hot pressed article by means of a gas pressure which is established between one of the mold-forming members and the article whereby the said walls of the article are sustained when the mold-forming member is being removed.

Having described my invention, what I claim is:

1. The method of cooling pressed glassware and the like which comprises forming an article by pressing a suitable charge between movable shaping members, withdrawing certain of the shaping members from the finished article and maintaining a cooling medium under pressure between the article and the withdrawn member during the entire time the member is leaving the article and with the space between the article and the withdrawn member open to atmosphere.

2. The method of cooling pressed glassware and the like which comprises forming an article by pressing a suitable charge between movable shaping members, withdrawing certain of the shaping members from the finished article and maintaining a blast cooling medium directed between the article and the withdrawn member during the time the member is leaving the article and with the space between the article and the withdrawn member open to atmosphere.

3. The method of cooling pressed glassware and the like which comprises forming an article by pressing a suitable charge between movable shaping members, withdrawing certain of the shaping members from the finished article and maintaining a blast cooling medium directed downwardly between the article and the withdrawn member during the time the member is leaving the article; permitting the cooling medium to escape during the blast; and continuing the blast after the member is completely withdrawn.

4. The method of cooling glass pressed articles and the like which method comprises pressing a charge of plastic glass between suitable forming members, withdrawing one of said members from the pressed article before the article is cooled, then providing a fluid under pressure between the forming member and the hot pressed article, and gradually reducing the effective pressure as the forming member is withdrawn.

5. The method of cooling glass pressed articles and the like which method comprises pressing a charge of plastic glass between suitable forming members, withdrawing one of said members from the pressed article before the article is cooled, then providing a fluid under pressure between the forming member and the hot pressed article, and gradually reducing the effective pressure as the forming member is withdrawn by separating the orifice through which the fluid issues from the article as the forming member recedes.

6. The method of cooling glass pressed articles and the like which method comprises pressing a charge of plastic glass between suitable forming members, withdrawing one of said members from the pressed article before the article is cooled, then providing a directed air blast to form a pressure between the forming member and the hot pressed article, and gradually reducing the effective pressure as the forming member is withdrawn by separating the orifice through which the fluid issues from the article as the forming member recedes.

7. The method of manufacturing packer's glassware which comprises pressing a suitable charge of plastic glass in suitable molds, applying a blast of free unconfined jets of cooling air adjacent the mouth of the mold, said jets being uniformly spaced around the circumference of the mouth of said mold, then gradually withdrawing one of the mold members from the pressed article and directing the blast of air downwardly between the molded article and the member being withdrawn to cool the molded article as the mold member is withdrawn.

8. The method of manufacturing packer's glassware which comprises pressing a suitable charge of plastic glass in suitable molds, applying a blast of cooling air adjacent the mouth of the mold at the completion of the pressing operation, permitting the cooling air to escape during the blast, then gradually withdrawing one of the mold members from the pressed article and continuing the blast of air downwardly to provide a layer of compressed air between the molded article and the member being withdrawn to cool the molded article as the mold member is withdrawn.

9. The method of manufacturing packer's glassware which comprises pressing a suitable charge of plastic glass in suitable molds, applying a blast of cooling air adjacent the mouth of the mold at the completion of the pressing operation, then gradually withdrawing one of the mold members from the pressed article and continuing a plurality of spaced apart jets of air downwardly to provide a layer of compressed air between the molded article and the member being withdrawn to cool the molded article as the mold member is withdrawn.

10. The method of preventing the collapse of hollow molded glassware when certain of the mold members are removed from the shaped article, which method comprises pressing the ware in suitable molds, withdrawing one of the pressing members and supplying air under pressure between the plunger and the interior walls of the pressed article to sustain and simultaneously cool the said walls, and permitting the air to escape during the time when it is being supplied.

11. The method of preventing the collapse of hollow molded glassware when certain of the mold members are removed from the shaped article, which method comprises pressing the ware in suitable molds, withdrawing one of the pressing members and supplying air in the form of a plurality of downwardly directed jets under pressure between the plunger and the interior walls of the pressed article to sustain and simultaneously cool the said walls.

12. The method of preventing the collapse of hollow molded glassware when certain of the mold members are removed from the shaped article, which method comprises pressing the ware in suitable molds, withdrawing one of the pressing members and supplying air in the form of a plurality of open jets under pressure directed downward between the plunger and the interior walls of the pressed article to establish pressure to sustain and simultaneously cool the said walls.

13. The method of manufacturing packer's ware and the like, which comprises pressing the ware in suitable molds, subjecting the upper portion of the mold to a blast of cooling air which is directed downwardly along the side walls of the pressing plunger, gradually removing the pressing plunger, and continuing the blast of cooling air as the pressing plunger is removed and until the ring mold is lifted from the body mold, and permitting the cooling air to escape before the ring mold is lifted.

14. A device for pressing glassware and the like comprising in combination a matrix mold adapted to receive a charge of glass, a pressing plunger, devices to cause a relative movement between the matrix mold and plunger to form a glass article from the charge in the mold, and means stationary relatively to the plunger to subject a portion of the mold to a cooling blast of air during the completion of the pressing movement and during the separation of the mold parts whereby the effective intensity of the blast decreases as the article in the mold recedes from the plunger.

15. A device for pressing glassware and the like comprising in combination a matrix mold adapted to receive a charge of glass, a pressing plunger, devices to cause a relative movement between the matrix mold and plunger to form a glass article from the charge in the mold, and means to subject a portion of the mold to a cooling blast of air during the completion of the pressing movement and during the separation of the mold parts, said means being constructed to provide a uniformly distributed flow of cooling air into and out of said article.

16. A device for pressing glassware and the like comprising in combination a matrix mold adapted to receive a charge of glass, a pressing plunger, devices to cause a relative movement between the matrix mold and plunger to form a glass article from the charge in the mold, and means stationary relatively to the plunger to subject a portion of the mold to a downwardly directed cooling blast of air during the completion of the pressing movement and to permit the escape of the blast of air during the separation of the mold parts whereby the effective intensity of the blast decreases as the article in the mold recedes from the plunger, said means being constructed to provide a uniformly distributed flow of cooling air into said article.

17. In a machine for the manufacture of pressed glassware, the combination of a block mold, a ring mold adapted to be seated on said block mold, a plunger, means for moving said block mold and ring mold into engagement with said plunger to shape a glass charge within the block mold, a cylinder, a piston within said cylinder, means operatively connecting said piston with said ring mold whereby when fluid under pressure is admitted to one side of said piston the ring mold is pressed against the block mold, a valve controlled by the said fluid pressure to open a passageway for transmission of cooling air, and means connected with said passageway to direct a blast of cooling air around said ring mold and between the ring mold and the plunger.

18. In a machine for the manufacture of pressed glassware, the combination of a block mold, a ring mold adapted to be seated on said block mold, a plunger, means for moving said block mold and ring mold into engagement with said plunger to shape a glass charge within the block mold, a cylinder, a piston within said cylinder, downwardly depending rods operatively connecting said piston with said ring mold whereby when fluid under pressure is admitted to one side of said piston the ring mold is pressed against the block mold, a valve controlled by the said fluid pressure to open a passageway for transmission of cooling air, and means comprising a perforated ring connected with said passageway to direct a blast of cooling air downwardly around said ring mold and between the ring mold and the plunger when the ring mold and plunger are separated.

19. In a machine for pressing glassware and the like, the combination of a carrier for a block mold, a block mold mounted on said carrier, a plunger, a ring mold mounted for movement relatively to said plunger, pneumatically operated means for raising and lowering said ring mold into and out of operative engagement with said block mold, and a cooling device operative in timed relation with said pneumatic means and adapted to supply air under pressure around said plunger when said ring mold is pressed into engagement with said block mold.

20. In a machine for pressing glassware and the like, the combination of a carrier for a block mold, a block mold mounted on said carrier, a plunger, a ring mold mounted for movement relatively to said plunger, pneumatically operated means for raising and lowering said ring mold into and out of operative engagement with said block mold, and a cooling device operative in timed relation with said pneumatic means and adapted to supply air under pressure around said plunger when said ring mold is pressed into engagement with said block mold, and to stop said air when the ring mold is lifted from the block mold.

21. In a glass-pressing machine, the combination of a mold, a ring mold cooperative with the mold, a plunger adapted to shape glass charges in the said mold, means for rendering the plunger effective, a perforated ring surrounding the upper end of the said plunger, a pipe adapted to convey compressed air to said perforated ring, and a valve operative in timed relation with the ring mold operating mechanism to admit air to the perforated ring when the plunger is being withdrawn from the ring mold.

22. In a glass-pressing machine, the combination of a mold, a ring mold cooperative with the mold, a plunger adapted to shape glass charges in the said mold, means for rendering the plunger effective, a perforated ring surrounding the upper end of the said plunger, and stationary relatively thereto, a pipe adapted to convey compressed air to said perforated ring, and a valve operative in timed relation with the ring mold operating mechanism to admit air to the perforated ring when the plunger is being withdrawn from the ring mold.

23. In a glass-pressing machine, the combination of a mold, a ring mold cooperative with the mold, a plunger adapted to shape glass charges in the said mold, means for rendering the plunger effective, a perforated ring surrounding the upper end of the said plunger, a pipe adapted to convey compressed air to said perforated ring, and a piston operative in timed relation with the ring mold operating mechanism to control a valve to admit air to the perforated ring when the plunger is being withdrawn from the ring mold, and prevent admission of air to the perforated ring when the ring mold is lifted from the block mold.

24. Glass shaping mechanism comprising a pair of cooperating mold members, means to bring said mold members together to mold a glass article, means to separate said mold members after the article has been formed, and means to circulate a cooling fluid into and out of the article while the mold members are being separated.

PETER KUCERA.